United States Patent Office 3,456,796
Patented July 22, 1969

3,456,796
METHOD FOR THE REMOVAL OF SOLUBLE PHOSPHATES IN WASTE WATER TREATMENT
John Clifford Eck, Convent, and William C. Zegel, Mendham, N.J., assignors to Allied Chemical Corporation, New York, N.Y., a corporation of New York
No Drawing. Filed Oct. 8, 1968, Ser. No. 765,984
Int. Cl. C02b 1/40, 1/20; B01d 21/01
U.S. Cl. 210—49                               7 Claims

ABSTRACT OF THE DISCLOSURE

A synergistic combination of alum and a cationic or anionic wax dispersion is exceedingly effective at removing dissolved phosphate ion from water by precipitation. These wax dispersions are formed by the emulsification of a natural or synthetic wax using a cationic or anionic organic emulsifying agent.

FIELD OF INVENTION

This invention relates to a chemical process for removing dissolved phosphate ion from water, especially domestic and industrial waste water. More particularly, this invention relates to the precipitation of phosphate ion dissolved in water by a combination of alum and a cationic or anionic wax dispersion, followed by separation of the substantially phosphate-free water from the phosphate-containing precipitate.

One of the most difficult problems in water pollution control is the growth of algae. Algal blooms now constitute a principal pollution problem in the Potomac River below Washington, D.C., in Lake Erie, and in countless other water resources. When these organisms die, they can exert an oxygen demand on the water in excess of its oxygen resources. Algal growths can also cause unpleasant tastes and odors in municipal water supplies. Current waste water treatment procedures remove most undesirable constituents thereof except dissolved phosphate. This dissolved phosphate ion provides algae with a necessary nutrient supply. If this phosphate supply could be removed from waste water, the algae could not survive and a major pollution control problem preventing the reuse of treated waste water would be solved. Currently known methods for reducing phosphate concentration to an acceptable level are not feasible from an economic standpoint in most instances.

DESCRIPTION OF THE PRIOR ART

Treatment of waste water by aerobic bacterial action removes part of the dissolved phosphate from the waste water by incorporating it into the bacterial sludge. Treatment by anaerobic bacterial action, however, produces no sludge and will even digest aerobically produced sludge with the release of the phosphate incorporated into such aerobic sludge.

Alum, lime, and salts of certain other metals, e.g., iron, will precipitate dissolved phosphate from water but impracticably high treating levels are usually required. When such large quantities of inorganic compounds are used to precipitate the dissolved phosphate ion, undesirable changes in pH may occur and the cost of treatment becomes excessive. Also, the precipitate may be unduly slow in forming or too fragile, thus requiring impracticably long or delicate treatment procedures, and/or large, expensive treatment facilities. New and improved processes for the removal of dissolved phosphate ion from water are therefore needed.

SUMMARY OF THE INVENTION

It is a primary object of this invention to provide an effective process for the removal of phosphate ion from water. It is a further object of this invention to provide a process for the removal of phosphate ion from water by the use of a synergistic combination of alum and a cationic or anionic wax suspension.

Further objects and advantages will become apparent from the description of the invention which follows in greater detail.

Our copending application, Ser. No. 634,443, describes the use of alum and a cationic synthetic organic latex in the removal of dissolved phosphate ion from water.

What the instant invention comprises is the treatment of water containing dissolved phosphate ion with a combination of alum and a cationic or anionic wax dispersion such that the concentration of alum in the water being treated is at least about 315 parts per 100 parts by weight of dissolved phosphate and the concentration of the wax dispersion is from about 10 to about 400 parts per 100 parts of dissolved phosphate, to thereby effectuate the rapid precipitation of at least a major portion of the phosphate ion dissolved in said water.

While the primary application of the process of this invention will be the removal of phosphate ion from industrial and municipal waste water, which normally contains up to about 100 p.p.m. of dissolved phosphate, the invention is not to be construed as so limited. For example, comparatively low phosphate content ground water can be treated by the process of the instant invention to reduce the phosphate content thereof. Likewise, mine and industrial wash water having very high phosphate ion contents can be effectively treated. Provided sufficient alum plus wax dispersion is added, virtually any amount of dissolved phosphate may be precipitated from an aqueous solution thereof. However, at very high concentrations of phosphate, i.e., above about 10,000 p.p.m., it is more practical generally to remove the water by evaporation and recover the phosphate from the nonvolatile evaporation residue.

The process of the present invention may be successfully used concomitantly with various standard methods of industrial or municipal waste water treatment in which a digestion, settling or filtration step or any combination thereof is used.

The term waste water as used in this specification and in the appended claims, is synonymous with the term sewage as the latter term is used by those skilled in the water treatment and sanitary engineering art, i.e., a dilute aqueous mixture of the wastes from households and industry that is convenient and economical to carry away by water. The term sewage, as used herein, refers to any of the ordinary types of aqueous liquors containing significant amounts of wastes such as fecal matter, domestic wastes, industrial wastes, and such like, and is not to be construed as being limited to meaning only aqueous liquors which in lay terms are ordinarily called sewages, nor should it be construed as being limited to mean aqueous liquors which have actually been carried through pipe, conduit or sewers.

The term treated sewage as used in this specification and in the appended claims is intended to include the effluent from primary or secondary settling basins, trickling filters, high-rate aeration or activated sludge processes, contact aeration, sand filtration, and other like sewage treatment processes.

The precipitation of phosphate ion from aqueous solution by addition of water soluble salts of metals such as aluminum, iron, copper, zinc and calcium, has been practiced for many years. One problem resulting from the use of such salts is that the treated water, although it may be substantially phosphate free, contains a high concentration of metal ions which are deleterious to equipment, livestock, wildlife and humans. Also, in some cases, such treatment can bring about undesirable decreases in the pH of the treated water.

Nothwithstanding such disadvantages, metal salts, particularly alum, are widely used to remove dissolved phosphate from waste water. The term alum as used in the instant application and in the appended claims connotes [Al₂(SO₄)₃·14H₂O] i.e., aluminum sulfate tetradecahydrate, which has a molecular weight of 594.4. The term phosphate ion refers to the $PO_4^{-3}$ moiety, having a molecular weight of 95. On a purely stoichiometric basis 1 mole of alum would neutralize 2 moles of phosphate anion, i.e. the stoichiometric weight ratio of alum to phosphate is therefore approximately 3.15/1.

The exact mechanism whereby alum precipitates dissolved phosphate is unknown. See for example, the article by Bjerrum, V. Chem. Revs., 46,381 (1950). It is known, however, that the amount of alum required to precipitate essentially all the phosphate ion in an aqueous solution hereof is significantly influenced by several factors in addition to the amount of phosphate ion present:

(1) The pH of the aqueous phosphate solution.

(2) The presence in the solution of other anions which also form insoluble aluminum salts.

(3) The amount of undissolved suspended matter present in the aqueous phosphate solution.

The influence of any other anions which may be present on the amount of alum required to precipitate the phosphate ion is reasonably certain. Such anions compete with phosphate for the $Al^{+3}$ cations resulting from the dissolution of the alum in the water being treated. The more other anions which are present, the greater the amount of alum needed to precipitate the dissolved phosphate.

The effect of pH is less clear. To a certain extent hydroxyl ion may be competing with phosphate for the $Al^{+3}$ ion. However, this does not fully explain the fact that the optimum pH range for phosphate ion removal by alum is in the range of about 4–7.5. At higher or lower pH's, less phosphate ion is removed by the same quantity of added alum.

The effect of suspended matter is similar to that of anions other than phosphate. Some of the added alum is used up in flocculating such suspended matter and cannot interact with phosphate ion.

The effect of comparatively high phosphate ion concentrations, i.e., greater than about 50 p.p.m. and the amount of alum required to precipitate said phosphate is also not readily explainable. As phosphate ion concentration in the water increases to such levels, comparatively more alum is required per part of phosphate to precipitate the latter.

Even under ideal conditions for phosphate removal, i.e., no suspended matter or competing anions present and a pH of about 6.0, at least a stoichiometric amount of alum is necessary for complete removal of the phosphate ion whether alum alone is used or alum plus wax dispersion in accordance with the teaching of the instant invention. A stoichiometric amount of alum as heretofore indicated is approximately 315 parts of alum, i.e., $$Al_2(SO_3)_2 \cdot 14H_2O$$

per 100 parts of phosphate anion. With ordinary waste water, where competing anions or suspended matter or both are present or the pH of the solution is outside the range of 4–7.5, somewhat more than 315 parts of alum per 100 parts of dissolved phosphate ion is generally necessary for the substantially complete removal thereof. By substantially complete removal it is meant that the phosphate ion content of the treated water is no greater than about 5 p.p.m. Algae require greater than about 5 p.p.m. of phosphate ion for excessive proliferation.

The removal of dissolved phosphate ion by treatment of the water containing said phosphate with alum alone entails a number of shortcomings which are substantially obviated by the present invention.

(1) Water having a comparatively high concentration of suspended matter and/or other anions in addition to phosphate will generally require substantially more than a stoichiometric amount of alum to precipitate the phosphate. When such waters are treated in accordance with the procedure of the instant invention, much less of an excess of alum over stoichiometric is generally required to precipitate the phosphate.

(2) When phosphate containing water is treated with alum alone the phosphate containing precipitate is frequently slow to form and settle. This is obviously undesirable since it requires excessive settling times and/or unduly large settling tanks. One of the important criteria of waste water treatment efficiency is the volume of waste water treated per unit time for a given size of treating facility. The phosphate containing precipitate is obtained significantly more rapidly when the waste water is treated in accordance with the process of our invention.

(3) For rapid and convenient processing it is desirable that the phosphate containing precipitate, i.e., "floc" be as durable as possible, or as it is generally stated in the water treatment art, "hardy." Flocs which are insufficiently hardy can disintegrate when an effort is made to separate said phosphate containing floc from the phosphate free water by standard procedures such as decantation or filtration. The phosphate containing flocs produced by treatment of phosphate ion containing waste water in accordance with the procedure of the instance invention are hardy (relatively difficult to disintegrate) and are therefore readily separable from the phosphate free water by conventional procedures.

The treatment of phosphate containing waste water in accordance with our invention is effectuated by the substantially simultaneous or immediately consecutive addition of the alum and the cationic or anionic wax dispersion, preferably with agitation, to the aqueous solution containing the phosphate anion. Where the alum and the dispersion are added immediately consecutively, either may be added first. The agitation serves to distribute the alum and the wax dispersion homogeneously through the water being treated. As soon as the alum and the wax dispersion are substantially homogeneously distributed, agitation is terminated. Length of the period of agitation is dependent upon several variables such as the design of the agitation equipment, the particular wax dispersion employed, the amount of dispersion and phosphate present, and the like. The period of agitation can vary from about 2 to about 60 minutes, but in some instances the desired homogeneity of distribution for effective phosphate removal can be achieved by agitating the water plus alum and wax dispersion mixture for a period of even less than 2 minutes. Shortly after agitation is terminated, a precipitate comprising the alum and wax dispersion constituents, and a major portion of the phosphate ion originally dissolved in the water commences to form. Standing for from about 5 minutes to about 1 hour is normally sufficient to precipitate most of the phosphate present. Where an exceptionally large volume of water or water of very high phosphate content is being treated, standing for up to two days may be necessary for complete formation of the precipitate. However, in virtually all instances the precipitate forms more rapidly when treatment is carried out in accordance with our invention than where treatment is with alum above. The supernatant water, now virtually free from dissolved phosphate, i.e., containing less than about 5 p.p.m. of phosphate, can be readily separated from this precipitate, i.e., substratum by known methods, as for example by filtration, centrifugation or decantation.

The synergistic effect of the combination of wax dispersion plus alum is shown by the fact that addition of wax alone produces essentially no phosphate containing precipitate. If the wax dispersion and the alum are added separately, either one being added first with a substantial hiatus between additions, the effect is substantially the same as if alum alone is added. It is only when the alum and wax dispersion are added either simultaneously or immediately consecutively, with either being added first in the latter case, that the effect is significantly superior to adding alum alone.

The decision as to whether to use an anionic or cationic wax dispersion to precipitate the dissolved phosphate in the water being treated depends upon the nature and concentration of the other constituents of the solution, both suspended and dissolved. With most solutions, the most effective wax dispersion is usually cationic. However, in a solution containing large amounts of suspended organic matter, e.g., raw sewage, a cationic wax dispersion is normally less efficient than an anionic one in that too much of it must be utilized solely to effect charge neutralization of the suspended particles which are mainly colloidal and hence negatively charged. A much lower concentration of an anionic wax dispersion plus alum will generally remove a considerable portion of the suspended organic matter and also precipitate the dissolved phosphate.

The determination of the preferred chemical type of wax dispersion, i.e., cationic or anionic, for any particular phosphate containing solution is best done empirically. One means of doing this is to place samples of the aqueous suspension to be treated in individual beakers and agitate the samples at a uniform rate while adding to the agitated samples an equivalent dosage of alum and an anionic, and alum and a cationic wax dispersion, respectively. After addition of the alum and wax dispersion and homogeneous distribution thereof throughout the solution, the treated solutions are allowed to stand either quiescent or with very mild agitation for a given period, usually about 5 minutes. The supernatant water is then separated from any precipitate which has formed. This precipitate should contain a major portion of the phosphate originally dissolved in the solution plus alum and wax dispersion constituents. The phosphate content of each of the supernatant water samples is then determined. The type of wax dispersion affording the lowest phosphate content is the type preferred for treating the particular solution. The particularly preferred wax dispersion within a given chemical type for treating a given solution may likewise be determined by similar comparative tests. (See for example, Babbitt and Baumann, "Sewerage and Sewage Treatment," 8th edition, John Wiley and Sons, Inc., New York, 1958, p. 449; and "Water Works and Sewerage," 81, 358 (1938), for further discussion of such empirical test methods.)

The optimum dosage of alum plus wax dispersion for any particular aqueous solution to be treated is also distinctly an individual problem and can be best determined— even as the particularly preferred wax dispersion—by actual comparative tests. However, as heretofore indicated, at least about 315 parts by weight of alum per 100 parts of phosphate anion is required when said alum is used in conjunction with a cationic or anionic wax dispersion to precipitate said phosphate ion in accordance with the teaching of the instant invention. Ordinarily from 500 to 1000 parts of alum per 100 parts of phosphate is used. For most aqueous solutions from about 10 to about 400 parts of wax dispersion per 100 parts of dissolved phosphate is generally an effective dose. In some solutions, however, containing large quantities of suspended matter and/or anions other than phosphate or which are highly basic or acidic, somewhat greater relative quantities of alum and/or wax dispersion may be necessary to remove the dissolved phosphate.

The process of the present invention may be successfully used concomitantly with various standard methods of industrial waste treatment in which a digestion, settling of filtration step or combination thereof is used.

The term cationic or anionic wax dispersion as used herein, contemplates a water-based, two-phase system wherein a particulate solid wax is the internal discontinuous phase dispersed in the aqueous, external, continuous phase. Such dispersions are frequently categorized as emulsions to which they are closely analogous. However, the term emulsion should properly be limited to systems where both the internal and continuous phases are liquid. The term cationic or anionic connotes that the hydrophobic portion of the dispersing (i.e., emulsifying) agent for the dispersed wax is positively or negatively charged, respectively.

The cationic and anionic wax dispersions of the instant invention are to be distinguished from the cationic and anionic synthetic organic latices of our copending applications, Ser. Nos. 643,443 and 646,188. Such latices are prepared by the free radical-induced emulsion polymerization of ethylenically unsaturated monomer. Of critical significance is the fact that, once coagulated, such latices cannot be re-emulsified.

In contradistinction, the cationic wax dispersions of the instant invention are prepared by dispersing a natural or synthetic wax in water with the aid of a cationic or anionic emulsifier. To effectuate such dispersion, a molten mixture of wax, preferably plus emulsifier, is added to vigorously stirred water, heated to about 95° C. In this manner, the molten wax is dispersed throughout the water as very fine globules which form a very fine solid dispersion when the water, wax and emulsifier mixture is cooled below the wax melting point. Waxes having a melting point ranging from about 40° C. to about 130° C. can be suitably dispersed. Alternatively, although not preferably, the dispersions of the instant invention can be prepared by adding the melted wax to an agitated and heated water-emulsifier mixture or, where the wax has a melting point below the boiling point of water, a mixture of wax, water and emulsifier can be heated with stirring above the wax melting point.

The wax dispersions of the instant invention have a particle size of up to about 5 microns and unlike the aforementioned synthetic organic latices of our copending applications can be re-emulsified following coagulation using any of the above-indicated emulsification techniques.

The wax dispersions of the instant invention are readily manipulated fluids which disperse readily in the water being treated. Additionally, dilute solutions of the dispersions are stable in long-term storage.

The term wax, as used by the skilled chemical artworker, cannotes a plastic, slippery, organic solid which is easily melted. As used in the instant invention, the term wax cannotes naturally occurring waxes or analogous synthetic materials having wax-like physical properties which are water insoluble but which may be dispersed in water with the aid of a cationic or anionic emulsifying agent, and which have a melting point ranging from about 40° C. to 130° C.

The predominant constituents of most naturally occurring waxes are $C_{10}$ to $C_{44}$ saturated hydrocarbons and/or monohydric alcohols and fatty acids which acids and alcohols may be present in the free state or interacted with each other to form esters. Small amounts of olefinic hydrocarbons, unsaturated alcohols and acids and hydroxy and/or ketonic alcohols and acids may also be present. Naturally occurring waxes are substantially free of aromatic molecules and of elements other than carbon, hydrogen, and oxygen. For example, beeswax consists essentially of a mixture of $C_{25}$ to $C_{31}$ fatty acids, fatty alcohols and saturated hydrocarbons.

Synthetic waxes generally consist of esters or saturated or partially oxidized aliphatic hydrocarbons or copolymers of ethylene with unsaturated esters, such waxes having a molecular weight ranging up to about 5000. Synthetic polyethylene wax, for example, consists essentially of normal hydrocarbons having a molecular weight range of 1500 to 5000.

Examples of natural or modified natural waxes suitable for preparing the dispersions of the instant invention include animal and vegetable waxes such as beeswax, spermaceti, carnauba, ouricury, sugar cane, raffa and candelilla, naturally occurring earth waxes such as ozocerite, montan, ceresin and lignite wax and oxidized petroleum waxes such as paraffin wax and microcrystalline wax. Examples of suitable synthetic waxes include the glycol stearates, oxidized Fischer-Tropsch wax, cracked high molecular weight polyethylene, oxidized low molecular weight polyethylene, oxidized and hydrolysed low molecular weight polyethylene and low molecular weight waxy copolymers of ethylene with one or more ethylenically unsaturated comonomers such as acrylic acid, methacrylic acid, vinyl acetate, methyl methacrylate, vinyl pyrrolidone, acrylamide, ethylene oxide, vinyl imidazoline, vinyl tetrahydropyrimidine and ethyl acrylate. The preparation of a number of the above-indicated copolymer waxes is described in copending, commonly assigned U.S. patent application Ser. No. 580,196.

If desired, a mixture of waxes can be used, but ordinarily it is not particularly advantageous. The preferred wax is an oxidized polyethylene wax having a melting point of 95° to 110° C.

The dispersed wax will preferably comprise from 10% to 50% by weight of the dispersion—most preferably 25% to 40%.

Any of a wide variety of known cationic or anionic organic emulsifying agents which are compatible with the wax can be used to prepare the wax dispersions of the instant invention—the more strongly ionic emulsifiers of either type being preferred. The specific kind and quantity of emulsifying agent used will depend upon the nature of the wax or waxes present, upon the conditions of dispersion and of course, on the phosphate content of the solution to be treated. From about 2 grams to about 100 grams of emulsifying agent, generally 10 to 50 grams, is usually used per 100 grams of wax. A mixture of emulsifying agents of the same type can advantageously be used, i.e., a combination of cationic or a combination of anionic emulsifiers. Likewise, in some instances, a combination of an ionic emulsifier and a nonionic emulsifier can advantageously be utilized.

Illustrative examples of suitable cationic emulsifying agents are the quaternary salts derived from suitable inorganic or organic acids or inorganic acid salts and basic nitrogen-containing compounds such as $C_{10}$ to $C_{30}$ primary fatty amines, mono- to deca-ethoxylated $C_{10}$ to $C_{30}$ primary fatty amines, secondary and tertiary alkyl and alicyclic amines having a total of from 2 to 30 carbon atoms and ethoxy derivatives of such secondary amines having from 1 to 15 ethoxy groups, $C_{10}$ to $C_{30}$ alkyl and alkenyl imidazolines and 1-hydroxyethyl imidazolines, trimethylated or triethylated $C_{10}$ to $C_{30}$ fatty acids amides or esters thereof and $C_{10}$ to $C_{30}$ N-alkyl pyridinium salts.

Suitable acids for interaction with the aforementioned basic nitrogen compounds include hydrochloric, hydrobromic, hydroiodic, sulfuric, sulfurous, benzene and toluene sulfonic, phosphoric, nitric, acetic, oxalic, propionic, tartaric, citric, sulfamic, glycolic, diglycolic, and ethylenediaminetetracetic. Suitable inorganic acid salts include ammonium sulfate, sodium bisulfate, potassium bisulfate, methyl hydrogen sulfate, and sodium acid phosphate.

Particularly preferred cationic emulsifying agents include the hydrochloride or acetate quaternary salts of $C_{10}$ to $C_{20}$ alkyl or alkenyl imidazolines, the hydrochloride or acetate quaternary salts of one to 15 times ethoxylated $C_{15}$ to $C_{25}$ primary fatty amines, $C_{10}$ to $C_{20}$ N-alkyl trimethyl ammonium chlorides and the hydrochloride or acetate quaternary salts of $C_{10}$ to $C_{20}$ primary fatty amines.

Suitable anionic emulsifying agents include the ammonium and alkali metal salts of $C_{10}$ to $C_{30}$ primary and secondary alkyl sulfonates and sulfates, of $C_8$ to $C_{20}$ alkyl benzene sulfonates and $C_8$ to $C_{20}$ aliphatic alcohol sulfates and of sulfates of ethoxylated $C_5$ to $C_{20}$ alkyl phenols and alkali metal, ammonium or $C_1$–$C_4$ quaternary amine salts of $C_{12}$ to $C_{30}$ fatty acids.

Illustrative examples of suitable nonionic emulsifying agents are polyethoxylated $C_7$ to $C_{30}$ alkyl phenols, polyethoxylated $C_7$ to $C_{30}$ fatty acids and fatty alcohols, $C_7$ to $C_{30}$ alkylphenoxy polyethylenoxy ethanols, polyethoxylated vegetable oils and $C_7$ to $C_{30}$ fatty acid amides of $C_2$ to $C_6$ alkanol amines. Preferred nonionic emulsifying agents are the $C_7$ to $C_{30}$ alkylphenoxy polyethyleneoxyethanols. Particularly preferred nonionic emulsifying agents include such alkylphenoxy polyethyleneoxyethanols wherein the alkyl group is $C_8$ to $C_{13}$. The nonionic emulsifier must be soluble in water to the extent of at least about 2% by weight. Increasing the length of the alkyl groups present in the nonionic emulsifier molecule tends to reduce its water solubility while increasing the number of ethoxyl groups present increases water solubility. The skilled art worker can readily select the proper degree of ethoxylation commensurate with alkyl group chain length to achieve at least the minimum requisite degree of water solubility.

The invention can be more fully understood by reference to the following examples. All parts are parts by weight unless otherwise expressly noted.

All dispersions of the following examples were prepared by adding a molten mixture of wax, plus emulsifier, to vigorously agitated water heated to 95° C. followed by cooling to room temperature at which point agitation was terminated.

EXAMPLE 1

To 40 g. of stirred, molten, oxidized polyethylene wax having an oxygen content of 3.2%, an acid number of 16, an ester number of 18 and a number average molecular weight of 3400 is added 10 g. of 1-hydroxyethyl-2-oleylimidazoline in the form of its acetate salt. This molten mixture is then added with vigorous stirring to 135 g. of water at 95° C. Upon cooling to room temperature a homogeneous, stable aqueous dispersion of the wax is formed.

EXAMPLE 2

Part A

A sample of effluent water from an activated sludge sewage treatment plant is analysed and found to have a pH of 7.7 and a phosphate ion concentration of 16 p.p.m. To an aliquot of this effluent is added 73 p.p.m. of alum, with stirring at 100 r.p.m. After addition is complete, stirring is continued for 2 minutes. After a further 10 minutes quiescent standing the precipitate which has formed is separated by suction filtration and the filtrate analysed. It is found to contain 5.4 p.p.m. of phosphate ion.

Part B

To a second aliquot is added with stirring at 100 r.p.m. simultaneously 20 p.p.m. of the wax dispersion of Example 1 and 73 p.p.m. of alum. Stirring, standing, and filtration is carried out as in part A. The aqueous filtrate solution contains less than 1.7 p.p.m. of phosphate.

Part C

A third aliquot is treated as in the above parts A and B with 20 p.p.m. of the wax dispersion of Example 1 and no alum. A small quantity of precipitate forms which is removed by suction filtration. However, the filtrate liquid still contains 16 p.p.m. phosphate anion.

EXAMPLE 3

A dispersion is prepared by the method of Example 1 using 40 g. of the polyethylene wax of Example 1, the acetate salt of 28 g. of 1-hydroxyethyl-2-oleylimidazoline and 135 cc. of water.

Several different samples of sewage plant effluent are treated with alum and the dose of alum required to reduce the phosphate ion content to 5 p.p.m. determined. The amount of alum plus the above-indicated dispersion required to achieve the same reduction in phosphate content to below 5 p.p.m. is also determined. In all cases, alum or alum plus dispersion are added simultaneously to stirred effluent. After addition is complete, stirring is continued for 2 minutes and the treated effluent let stand quiescent for 5 minutes, after which the supernatant solution is separated from the precipitate which has formed and the phosphate content of the solution determined.

Results are tabulated below:

TREATING LEVEL TO REDUCE $PO_4^{-3}$ CONTENT TO 5 P.P.M.

| Initial $PO_4^{-3}$ content | Amt. alum alone required | Amt. alum and wax dispersion required |
|---|---|---|
| 26.9 | 170 | 100+25 |
| 16.8 [1] | 280 | 200+20 |
| 6.5 | 30 | 20+5 |

[1] This effluent sample contained very substantial amounts of suspended organic matter, hence an exceptionally high treat level of alum or alum plus wax dispersion is required for phosphate precipitation.

It is apparent, in all cases, when wax dispersion is used conjointly with the alum, less alum is required for the same phosphate removal effectiveness. Thus substantially less pH change and less introduction of other ions i.e. $Al^{+3}$ and $SO_4^{-2}$, has taken place in the phosphate free water.

EXAMPLE 4

A sample of water which simulates mine wash water or other water containing substantial amounts of suspended inorganic matter is prepared by suspending 200 p.p.m. of bentonite in water containing 23.6 p.p.m of dissolved phosphate. Using the test conditions of Example 3, 130 p.p.m. of alum is required to reduce the phosphate content to below 5 p.p.m. However, only 90 p.p.m. alum plus 20 p.p.m. of the wax dispersion of Example 3 is required to effect the same phosphate reduction.

EXAMPLE 5

An anionic wax dispersion is prepared using 40 g. of the oxidized polyethylene wax of Example 1, 20 g. potassium tallate (potassium salt of tall oil acid) and 125 cc. of water.

Raw sewage having a phosphate content of 18.4 p.p.m. and appreciable suspended organic matter is treated with alum alone in accordance with the procedure of Example 3, 185 p.p.m. of alum is required to reduce the phosphate content to 5 p.p.m. Only 150 p.p.m. alum, plus 25 p.p.m. of the above-indicated wax dispersion, is required to effect the same reduction in phosphate content.

EXAMPLE 6

The synergistic effect of the substantially simultaneous addition of alum, plus wax dispersion, is shown by the results tabulated below.

Waste water containing 23.6 p.p.m. phosphate is treated with 100 p.p.m. of alum using the procedure of Example 3 (two minutes of agitation after addition followed by five minutes of quiescent standing and filtration). The aqueous filtrate contains 6.8 p.p.m. phosphate. If alum alone is used, stirred for two minutes and let stand five minutes and then 20 p.p.m. of the wax dispersion of Example 3 added, stirred two minutes and let stand five minutes followed by filtration, the aqueous filtrate contains 6.6 p.p.m. phosphate, essentially unchanged from the effect of alum alone. In a third run 20 p.p.m. wax dispersion is added first, stirred two minutes, let stand five minutes, and the solution filtered. The filtrate contains 6.8 p.p.m. phosphate, again unchanged from the effect of alum alone. However, when 100 p.p.m. alum and 20 p.p.m. wax dispersion are added simultaneously, the mixture stirred two minutes, let stand five minutes and filtered, the filtrate contains only 2.6 p.p.m. phosphate.

If 100 p.p.m. of alum is added, the mixture stirred 30 seconds, 20 p.p.m. wax dispersion added, stirring continued an additional two minutes followed by five minutes of standing and filtration, the filtrate contains 3.1 p.p.m. phosphate showing that immediately consecutive addition of alum and wax dispersion is substantially as effective as simultaneous addition.

EXAMPLE 7

Part A

A synthetic waste water is prepared by adding 200 p.p.m. bentonite to deionized water containing 23.6 p.p.m. $PO_4^{-3}$ ion from $Na_3PO_4$. To a sample of this waste water is added, with stirring, 50 p.p.m. alum. Stirring is continued for five minutes followed by 15 minutes of quiescent standing and filtration. The filtrate contains 5.8 p.p.m. $PO_4^{-3}$ ion.

Part B

A second sample of the waste water used in part A is treated by the simultaneous addition of 50 p.p.m. alum and 20 p.p.m. of the wax dispersion of Example 1. Stirring, settling and filtration are as in part A. The filtrate contains 4.0 p.p.m. $PO_4^{-3}$ ion.

This example indicates that, even with water containing phosphate anion and little additional other type anion, the combination of alum, plus wax dispersion, is superior to alum alone at reducing phosphate content below the algae proliferation level of 5.0 p.p.m.

EXAMPLE 8

A synthetic waste-water solution similar to that of Example 7, except containing 26.6 p.p.m. $PO_4^{-3}$, is utilized to show that treatment of phosphate-containing waste water by the procedure of our invention affords a faster forming floc than treatment with alum alone.

Part A

To an aliquot of the waste water is added 50 p.p.m. alum followed by five minutes of stirring, five minutes of standing, and filtration. The filtrate contains 14.6 p.p.m. $PO_4^{-3}$.

Part B

Same treatment as in part A, except 10 minutes of standing, and filtration. The filtrate contains 13.8 p.p.m. $PO_4^{-3}$.

Part C

Same treatment as in part A, except 15 minutes of standing, and filtration. The filtrate contains 12.9 p.p.m. $PO_4^{-3}$.

Part D

Same treatment as in part A, except 15 hours of standing, and filtration. The filtrate contains 5.0 p.p.m. $PO_4^{-3}$.

Part E

Treatment by simultaneous addition of 50 p.p.m. alum and 20 p.p.m. of the wax dispersion of Example 1, five minutes of stirring, five minutes of standing, followed by filtration. The filtrate contains 5.8 p.p.m. $PO_4^{-3}$ Part F Treatment as in part E, except 15 minutes of standing, and filtration. The filtrate contains 4.3 p.p.m. $PO_4^{-3}$.

EXAMPLE 9

The following experiments were conducted to determine if treatment in accordance with our invention by a combination of alum and a wax dispersion produces a hardier floc than treatment by alum alone. A sewage treatment plant effluent water containing 25.4 p.p.m. $PO_4^{-3}$ was used in all tests.

Part A

To the effluent water is added 50 p.p.m. alum, followed by five minutes of stirring at 100 r.p.m., five minutes of standing, and filtration. The filtrate contains 11.8 p.p.m. $PO_4^{-3}$.

Part B

Treatment same as in part A, except that after standing it was stirred again for five minutes at 35 r.p.m., and then filtered. The filtrate contains 16.8 p.p.m. $PO_4^{-3}$.

Part C

To the effluent water is added 50 p.p.m. alum and 10 p.p.m. of the wax dispersion of Example 1, followed by stirring, standing, and filtration as in part A. The filtrate contains 6.4 $PO_4^{-3}$.

Part D

Treatment of the effluent water as in part C, except stirring again for five minutes at 35 r.p.m. after standing, followed by filtration. The filtrate contains 6.8 p.p.m. $PO_4^{-3}$.

These experiments demonstrate that the flocs produced by the procedure of the instant invention are less easily broken up by agitation and, hence, are more amenable to separation from the supernatant water by conventional processing equipment.

EXAMPLE 10

A number of aliquots of a sewage plant effluent waste water containing 27.8 p.p.m. $PO_4^{-3}$ are treated in accordance with the procedure of the instant invention with alum and a variety of wax dispersions. In all cases, 75 p.p.m. alum and 20 p.p.m. wax dispersion are added simultaneously, followed by five minutes of stirring at 100 r.p.m., 15 minutes of quiescent standing, and filtration. The phosphate content of the filtrate is tabulated below:

| Wax | Emulsifier | $PO_4^{-3}$ content of treated water (p.p.m.) |
|---|---|---|
| Oxidized polyethylene 3.2% O, mol. wt. 1,750. | Morpholine/oleic acid salt | 4.5 |
| Carnauba No. 3-NC | do | 5.0 |
| Oxidized Fischer-Tropsch, mol. wt. 2,000. | Sipanol 2E1 [1]/oleic acid salt | 4.7 |
| Oxidized paraffin | do | 4.4 |
| Oxidized polyethylene 3.2% O, mol. wt. 1,750. | Hodag C-100-0 [2]/acetic acid salt. | 3.8 |
| Carnauba No. 3-NC | Sipanol 1S2 [3]/acetic acid salt. | 4.8 |
| Oxidized polyethylene 3.2% O, mol. wt. 1,750. | do | 2.9 |
| Oxidized polyethylene 3.2% O, mol. wt. 1,750. | Sipanol 1S2/acetic acid salt. | 3.1 |
| Beeswax | Armeen T [4]/acetic acid salt | 4.8 |
| Oxidized polyethylene 3.2% O, mol. wt. 1,750. | Sipanol 2M1 [5]/oleic acid salt | 3.6 |
| Do | Sipanol 2 E1/oleic acid salt | 4.0 |

[1] Diethyl amine plus 1 mol ethylene oxide.

[2]
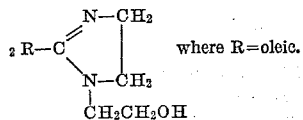
where R=oleic.

[3] Stearyl amine plus 2 mol ethylene oxide.
[4] Tallow amine (R—$NH_2$).
[5] Dimethyl ethanolamine.

EXAMPLE 11

Amine wash water containing 115 p.p.m. $PO_4^{-3}$ ion is treated by the simultaneous addition, with stirring, of 500 p.p.m. alum and 100 p.p.m. of the wax dispersion of Example 1. After addition is complete, stirring is continued for 10 minutes followed by 15 minutes of standing and decantation of the supernatant liquid from the precipitated substratum. The decanted liquid contains 4.9 p.p.m. $PO_4^{-3}$. Treatment with 500 p.p.m. alum alone, with stirring, settling and decantation, as above, affords a supernatant containing 17.7 p.p.m. $PO_4^{-3}$.

Various modifications will be apparent to one skilled in the art, and it is not intended that this invention be limited to the details in the specific examples presented by way of illustration. Accordingly, the scope of the invention is limited only by the appended claims.

We claim:
1. A process for treating water containing phosphate anion to remove a portion thereof comprising:
   (a) adding to an influent of said water a cationic or anionic wax dispersion and at least about 315 parts of alum per 100 parts of dissolved phosphate;
   (b) permitting the concentration of a floc comprising said phosphate anion and alum and wax dispersion constituents into a substratum; and
   (c) separating the said floc from said water.
2. A proces in accordance with claim 1 wherein said addition is accompanied and followed by sufficient agitation to distribute said alum and said wax dispersion substantially homogeneously throughout said water containing phosphate anion.
3. A process in accordance with claim 1 wherein said separating is effected by decantation.
4. A process in accordance with claim 1 wherein said separating is effected by filtration.
5. A process in accordance with claim 1 wherein said water containing phosphate anion is raw sewage and wherein said wax dispersion is anionic.
6. A process in accordance with claim 1 wherein said water containing phosphate anion is treated sewage and wherein said wax dispersion is cationic.
7. A process in accordance with claim 1 wherein said wax is oxidized polyethylene wax.

References Cited

UNITED STATES PATENTS 3,142,638  7/1964  Blaisdell et al. _____ 210—53 X
3,386,910  6/1968  Forrest _____ 210—6 X MICHAEL E. ROGERS, Primary Examiner U.S. Cl. X.R.

210—52, 54